Jan. 18, 1955     J. J. SMITH     2,699,754
POULTRY FEEDER
Filed Nov. 16, 1953
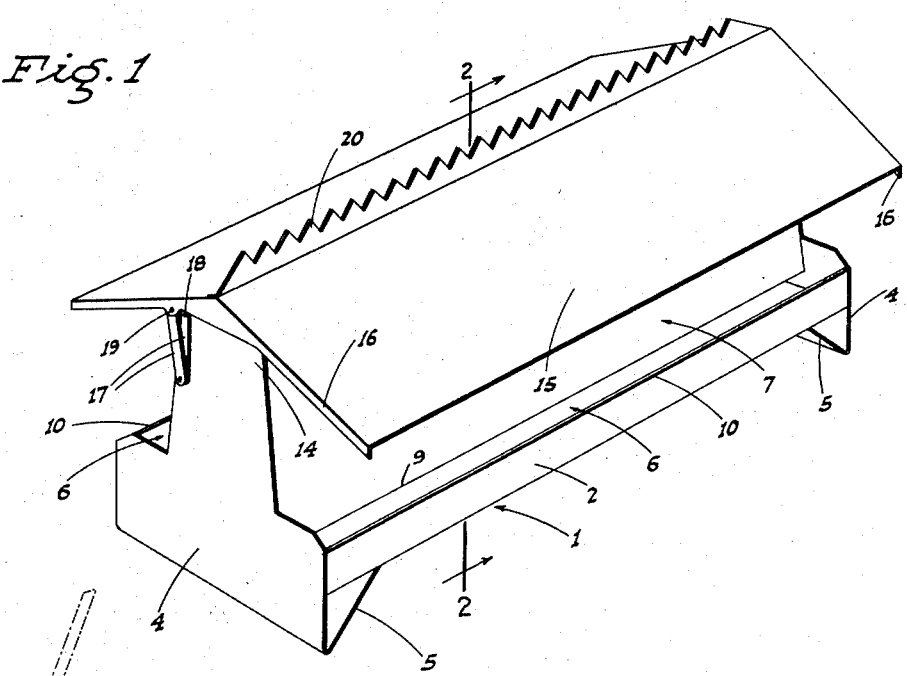
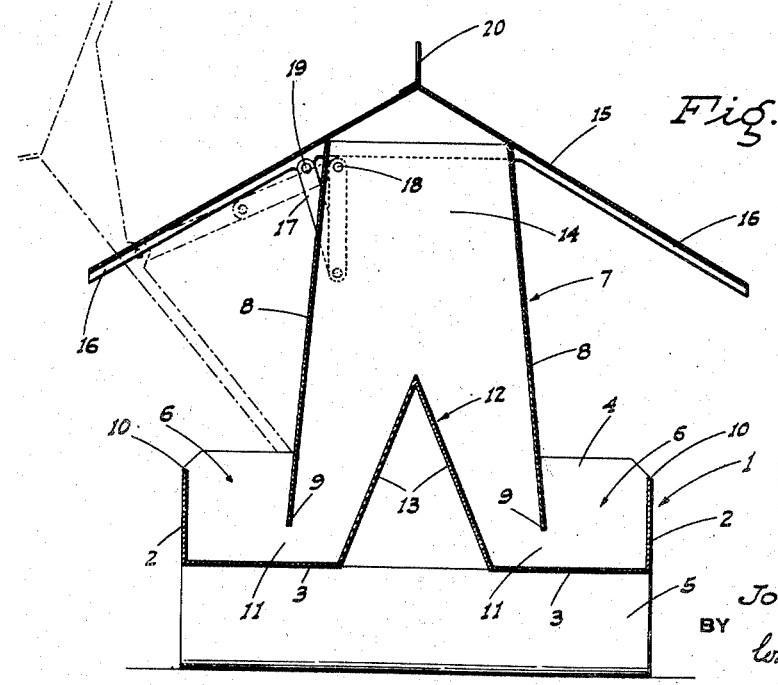
INVENTOR
Johnie J. Smith
BY
ATTYS

United States Patent Office 2,699,754
Patented Jan. 18, 1955

2,699,754

POULTRY FEEDER

Johnie J. Smith, Turlock, Calif.

Application November 16, 1953, Serial No. 392,150

1 Claim. (Cl. 119—52)

This invention is directed to, and it is a major object to provide, an improved poultry feeder; the feeder being portable and of the type which delivers granular feed from a hopper into a feeding trough.

Another important object of this invention is to provide a poultry feeder of the type described which includes a hopper and divider therein, which are of novel construction, and which function to maintain a progressive replenishment of the feed to the feeding zones of the trough, and without restriction or clogging of the feed in the hopper, whereby free flowing of said feed is assured.

An additional object of the invention is to provide a poultry feeder designed so that the fowl may feed from the device while standing on the floor; this as distinguished from a porch-type feeder to and from which the fowl must jump. Such jumping—avoided by the present device—is undesirable, as it causes "bumble" foot, and in laying hens sometimes results in internal egg breakage.

A further object of the invention is to provide a poultry feeder which includes a novel roof structure, permitting the device to be used indoors or outdoors, and in wet or dry weather, without any deleterious effect on the feed contained in the hopper below the roof; the latter being mounted in a novel manner for opening to permit of refilling of said hopper.

A still further object of the invention is to provide a poultry feeder wherein an adequate supply of feed is available to the fowl at all times, yet arranged so that there is a minimum of feed waste; the design of the feeder being such that even timid hens will feed and become layers instead of culls.

A separate object of the invention is to provide a poultry feeder, of portable type, which is constructed in its substantial entirety from sheet metal; the design being such that a minimum of separate pieces are required.

It is also an object of the invention to provide a poultry feeder which is designed for ease and economy of manufacture; the device being sturdy in construction and durable for use.

Still another object of the invention is to provide a practical and reliable poultry feeder, and one which is designed for ease and economy of manufacture.

These objects are accomplished by means of such structure and relative arrangement of parts as will fully appear by a perusal of the following specification and claim.

In the drawings:

Fig. 1 is a perspective view of the poultry feeder.

Fig. 2 is an enlarged transverse sectional elevation on line 2—2 of Fig. 1; the roof being shown in closed position in full lines, and in open position in broken lines.

Referring now more particularly to the drawings, and to the characters of reference marked thereon, the improved poultry feeder comprises an elongated, open-topped, relatively shallow feeding trough, indicated generally at 1; such trough including sides 2, a bottom 3, and ends 4.

The ends 4 extend downwardly some distance below the bottom 3 of trough 1, and thence are turned inwardly and diagonally upwardly as braces 5 which are secured to the bottom 3 in any suitable manner.

The downwardly extending portions of the ends 4, together with the braces 5, form rigid transverse feet which support the device from the floor, and in a plane such that fowl standing on the floor can feed easily in the longitudinal feeding zones 6 in the trough 1 directly inwardly of the sides 2.

An elongated, initially open-topped hopper, indicated generally at 7, extends longitudinally from end to end of the trough 4; such hopper 7 including sides 8 whose lower portions extend into the trough 1, with said lower portions secured at the ends to the ends 4 of the trough 1.

The hopper 7 is of substantially lesser width than the trough 1, and is symmetrically disposed between the sides 2, so that the lower portions of the sides 8 of the hopper are spaced inwardly from said sides 2 and define the back wall of the feeding zones 6.

At their lower edges 9 the sides 8 of hopper 7 terminate in a horizontal plane some distance above the bottom 3 but below the horizontal plane of the upper edges 10 of sides 2; thus providing a feed flow slot 11 between each lower edge 9 and the bottom 3.

The granular feed, a quantity of which is contained in the hopper 7, flows downwardly from the latter through the slots 11 and into the feeding zones 6 of trough 1; such flow being progressive as the feed is eaten by the fowl from the feeding zones 6.

Additionally, the feed flows from the hopper 7, through the slots 11 into the feeding zone 6 of the trough 1, is free at all times, as well as being equalized, by reason of the following structural arrangement:

The sides 8 of hopper 7, rather than converging downwardly as in conventional hopper structures, diverge in a downward direction; this to the end that there is no tendency for adherence of the feed to the inner faces of the sides 8 as such feed gravitates in the hopper.

In order to assure of proper division of the feed flowing from the hopper 7—i. e. to equalize the flow through the slots 11—the bottom is formed, centrally of its side edges and for its full length, with an upstanding divider, indicated generally at 12. The divider 12 is triangular or peak-shaped in cross section, as shown, and includes flat sides 13 which diverge downwardly in spaced relation to the lower portions of the sides 8 of hopper 7. The sides 13 of the divider 12 merge with the bottom 3 of trough 1 a distance laterally inwardly from, and in a plane below, the lower edges 9. Thus, with such structure of the hopper 7 and divider 12 an even non-clogging gravitational flow of the feed is obtained from said hopper into the feeding zones 6, and with an equal amount of feed delivering to each of said zones.

Above the ends 4 of trough 1 the hopper 7 is closed by symmetrical upward extensions 14 of said ends; such extensions terminating at their upper edges flush with the corresponding edges of the sides 8. The ends 4, together with their extensions 14, are one-piece, which is generally of inverted T-shape in end elevation.

In order to prevent the entry of rain or foreign substances into the hopper 7, and to further assure against the fowl perching on any part of the trough 1 and hopper 7, I provide an elongated, relatively flat-angle gable roof 15, which is formed from a single piece of sheet metal having flanges 16 down-turned at the ends.

When the roof 15 is in place it rests directly and symmetrically on the upper end of the hopper 7; the upward extensions 14 of ends 4 projecting in lapping relation to, and engaging the inner faces of the flanges 16 adjacent the apex portion of the roof. This prevents any lateral displacement of the roof 15 on the hopper 7.

At each end of the device an articulated linkage 17, which is normally in a collapsed depending position, is pivoted at one end, as at 18, to an upper corner of the extension 14, and is pivoted at the other end, as at 19, to the adjacent flange 16 intermediate the apex and outer edge of the roof on one side thereof. With this arrangement the roof is manually swingable from an in-place position, as in full lines in Fig. 2, to an open position upstanding alongside the hopper 7, as in broken lines in such figure; the roof 15 when open resting at the lower edge on, and spanning between, the ends of the trough 4 closely adjacent one of the hopper sides 8. In this open position of the roof 15 the articulated linkage 17 is extended and holds said roof in standing position while the hopper 7 is being filled with feed from above.

As the roof 15 when open is wholly clear of the upper end of the hopper 7, filling of the latter with feed can be accomplished readily and without obstruction.

The roof 15 is returned from open to closed position simply by manually swinging the same in an appropriate direction to collapse the linkage 17 and to dispose the roof symmetrically on the hopper 7.

The roof 15 from the apex to the outer edge on each side thereof is of such width that when the roof is in closed position it not only overhangs the feeding zones 6 of the trough 1, but projects some distance outwardly thereof; the purpose being not only to shelter the feed in said zones 6, but also to prevent the fowl from perching on the sides 2, thus necessitating that they remain on the floor or ground while feeding.

To prevent the fowl from perching or roosting on the roof 15 at the apex or peak, such roof is there fitted with a full length serrated or saw-toothed ridge plate 20.

The above described feeder, in addition to being portable and of sturdy yet light-weight construction, provides for the expeditious and advantageous feeding of fowl, with the feed always available in the feeding zones 6, yet protected from the weather whether in the hopper 7 or in said zones.

While the feeder is adaptable for use to feed various kinds of poultry, it is especially useful for the feeding of laying hens; this for the reason that the hens, which are quite heavy, must feed from the ground, with the advantages hereinbefore explained.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In a poultry feeder which includes a trough unit and an initially open-topped hopper secured to and upstanding from the trough unit to feed into the same, the hopper having end walls and the trough unit having relatively short end walls; a gable-type roof to close the hopper normally resting on top of the same and normally depending contracted pairs of toggle links connecting the roof to the hopper at both ends of the same, means pivoting one link of each pair at its upper end on the corresponding end wall of the hopper adjacent one side thereof, and means pivoting the other link of such pair at its upper end on the roof adjacent but laterally out from the pivot means of the one link; the length of each pair of links when extended being such that when the side edge of the roof nearest the links is resting on the upper edge of the end walls of the trough unit at the junction of such walls with the sides of the hopper, the opposite side edge of the roof will lie in a plane laterally out from said one side of the hopper.

References Cited in the file of this patent

UNITED STATES PATENTS

| Number | Name | Date |
|---|---|---|
| 1,099,331 | Zimmer | June 9, 1914 |
| 1,242,399 | Weaver | Oct. 9, 1917 |
| 1,367,524 | Davis | Feb. 1, 1921 |
| 1,462,751 | Huntington | July 24, 1923 |
| 1,593,705 | Nebergall | July 27, 1926 |
| 1,636,658 | Speicher | July 19, 1927 |
| 1,701,338 | Rowles | Feb. 5, 1929 |
| 1,851,846 | Kegler | Mar. 29, 1932 |
| 1,907,372 | Stolp | May 2, 1933 |
| 2,116,361 | Nasman | May 3, 1938 |
| 2,234,112 | Emrick | Mar. 4, 1941 |
| 2,408,477 | Payne | Oct. 1, 1946 |
| 2,461,525 | Corrigan | Feb. 15, 1949 |
| 2,650,566 | Rook | Sept. 1, 1953 |